April 14, 1964 G. E. MESTDAGH 3,129,007

PHONOGRAPH PICK-UP ARM CONTROL

Filed March 9, 1961

INVENTOR
GILBERT E. MESTDAGH.

BY
Frank R. Jifari
AGENT

United States Patent Office 3,129,007
Patented Apr. 14, 1964

3,129,007
PHONOGRAPH PICK-UP ARM CONTROL
Gilbert Edouard Mestdagh, Emmasingel, Eindhoven, Netherlands, assignor to North American Philips Company, Inc., New York, N.Y., a corporation of Delaware
Filed Mar. 9, 1961, Ser. No. 94,627
2 Claims. (Cl. 274—15)

This invention relates to phonographs in which the pick-up arm is automatically moved from outside the record to above the record, lowered on outer edge of the record and, after the record has been played off, lifted and moved outwardly. The outer edge of the record by means of a rotary control disc, and between the control disc and the pick-up arm a slip coupling is provided which permits of blocking horizontal movement of the pick-up arm.

In a known structure of the above-mentioned kind, the control disc moves the pick-up arm to and fro due to a cam operating a two-armed control hook secured to the vertical shaft of the pick-up arm.

According to the invention, the coupling between the control disc and the pick-up arm comprises a rod with a motion component in its longitudinal direction, which is periodically coupled to a disc on the shaft of the pick-up arm by means of friction.

An advantage of the strcture according to the invention over the known construction is the saving in space which is obtained by causing the rod to move substantially in its longitudinal direction. In addition, the friction coupling required between the control disc and the pick-up arm is realised by the rod itself, which results in a simple structure.

Another feature of the invention is that one end of the rod is coupled to a fixed point of the rotary control disc and its other end is connected by means of a lever to the frame of the device.

In one embodiment of the invention, the rod is periodically pushed resiliently against the disc on the shaft of the pick-up arm, while in another embodiment the rod is provided with a resilient element which periodically pushes against the said disc.

According to a further feature of the invention, the disc on the shaft of the pick-up arm is preferably rigidly connected to the rod or the resilient element during the outward movement of the pick-up arm.

This results in the advantage that, during the outward movement of the pick-up arm, slip in its drive is impossible, so that in its extreme position the pick-up arm does not unexpectedly find itself above the record instead of beside the record.

According to the invention, due to the above-noted rod being coupled to a lever which is connected to the frame of the device, it is possible to use this lever for automatically lifting and lowering the pick-up arm by providing it with an inclined surface.

In order that the invention may be readily carried into effect, one embodiment thereof will now be described in detail, by way of example, with reference to the accompanying diagrammatic drawings, in which.

Figures 1, 2, 3, 4:
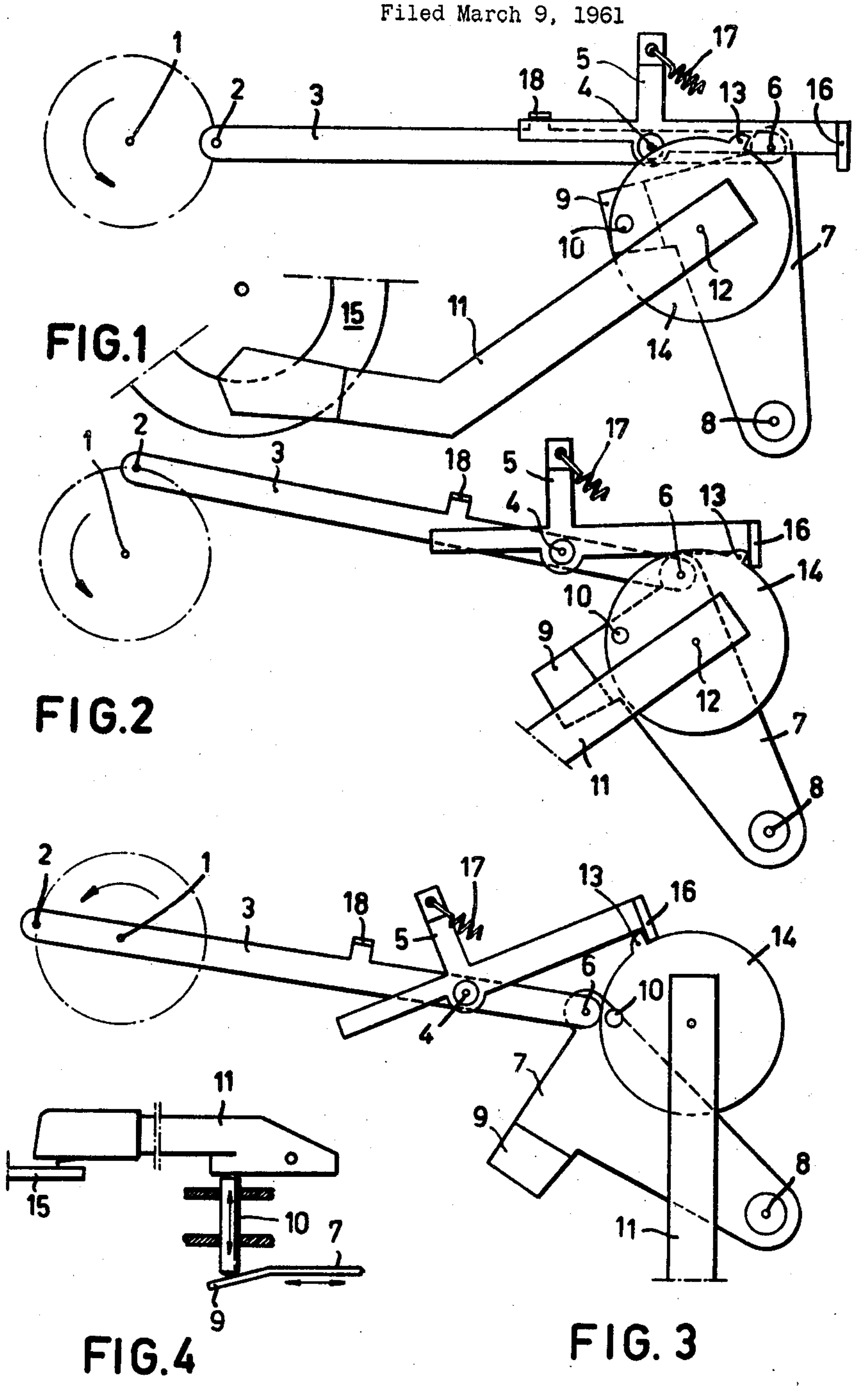
FIG. 1 shows the coupling between the control disc and the pick-up arm in the lowered position on the record directly before the pick-up is lifted.
FIG. 2 shows the mechanism position during movement of the pick-up arm to the outside edge of a record.
FIG. 3 shows the mechanism in its outer extreme position or when it is about to move inwards.
FIG. 4 is a side-view in detail of FIG. 1.

Referring now to FIGURE 1, a pin 2 secured to a control disc 1 (shown diagrammatically) rotates about the centre 1 thereof. To the pin 2 one extremity of a rod

3 is coupled which rod has a resilient element 5 arranged thereon to be rotatable about point 4. The other extremity of the rod 3 is connected to point 6 of a lever 7, which can pivot about a shaft 8 of the frame. The lever 7 has an inclined surface 9 on which a pin 10, slidable in a vertical sense, bears. In this position, a pick-up arm 11 can swing freely about its vertical shaft 12. A disc 14 provided with a cam 13 is also secured on shaft 12. Thus, the pick-up arm 11 rests freely on a record 15. When the pick-up needle now enters the running-out groove of the gramophone record, the control disc 1 is connected to a driving mechanism, in a manner known per se, and starts to rotate in an anti-clockwise direction. The rod 3 is thus drawn to the left (FIG. 2) and, in turn, causes the lever 7 to turn in an anti-clockwise direction, so that the inclined surface 9 (see FIG. 4 also) pushes up the pin 10 upwards and the latter pushes up the pick-up arm 11, thus lifting the needle off the record. At the same time stop 18 on rod 3 moves upwardly away from the associated end of resilient element 5 whereby the element 5, under the action of spring 17, pivots about point 4 in a clockwise direction. Thus, catch 16 is brought into frictional engagement with the disc 14 (not shown) and since rod 3 draws element 5 to the left in the drawings, by virtue of the pivotal connection at point 4, the disc 14 and arm 11 are rotated in a counter-clockwise direction. If, due to unforeseen circumstances, slip occurs between the catch 16 and the disc 14, the catch 16, upon further movement of rod 3 to the left, engages the cam 13 on the disc 14 as indicated in FIGS. 2 and 3. However barring such slippage, the rod 3 will turn the disc 14 by means of the catch 16 of the resilient element 5, resulting in the pick-up arm 11 being moved outside the edge of the record. This position is shown in FIGURE 3. When the control disc 1 is rotated still further, the pin 2 and the rod 3 move to the right, so that the catch 16 of the resilient element 5, coupled to the disc 14 by means of friction, swings the pick-up arm inwards until, above the edge of the record 15, it is arrested by a diameter scanning device known per se. At this point, catch 16 slips along the edge of the disc 14 until the element 5 has turned about point 4 so far that the extremity of the element 5 opposite catch 16 engages the stop 18 of the rod 3, so that upon further movement of the rod 3 to the right, the catch 16 is disengaged from the disc 14 until the position of FIGURE 1 is reached again. During the movement of the lever 7 to the right, the pin 10 moves from the horizontal portion thereof (FIG. 4) onto the inclined part 9 during the last portion of the cycle, resulting in the pick-up 11 being lowered onto the edge of the record.

What is claimed is:

1. A tone arm control apparatus for a phonograph comprising a rotatably driven control disc, a rod member pivotally connected to the periphery of said control disc at one end thereof, a pivotally mounted lever having an inclined surface portion, the other end of said rod member being pivotally connected to said lever for imparting to said rod a substantial motion component in the longitudinal direction thereof, a pivotal tone arm having a pin engaging said lever for raising and lowering said tone arm, a disc means connected with said tone arm, and coupling means pivotally connected to and movable with said rod member for engaging said disc means to rotate said tone arm upon movement of said rod member in one direction and being disengaged from said disc upon movement of said rod member in the opposite direction.

2. A tone arm control according to claim 1 wherein said coupling means comprises a generally T-shaped lever pivotally connected to said rod member at the juncture of the cross bar and leg of said T-shaped lever, one end of said cross bar having a catch for engaging said disc and the other end of said cross bar being engaged by a stop on said rod member for rotating said T-shaped lever for disengaging said catch and said disc.

References Cited in the file of this patent

UNITED STATES PATENTS

| | | |
|---|---|---|
| 1,357,602 | Welch | Nov. 2, 1920 |
| 1,406,608 | Brooks et al. | Feb. 14, 1922 |
| 2,392,111 | Alexandersson | Jan. 1, 1946 |
| 2,488,260 | Ascoli | Nov. 15, 1949 |
| 3,030,115 | Hardy et al. | Apr. 17, 1962 |